Aug. 17, 1954    R. G. ROWE ET AL    2,686,676

RECORDING PROGRESS INDICATOR FOR MAGNETIC RECORDS

Filed April 8, 1949

INVENTOR
George B. Bona
Richard G. Rowe
BY Curtis, Morris & Safford
ATTORNEY

Patented Aug. 17, 1954

2,686,676

UNITED STATES PATENT OFFICE 2,686,676

RECORDING PROGRESS INDICATOR FOR MAGNETIC RECORDS

Richard G. Rowe, Redding Ridge, and George B. Bona, Bridgeport, Conn., assignors to Dictaphone Corporation, Bridgeport, Conn., a corporation of New York Application April 8, 1949, Serial No. 86,252

6 Claims. (Cl. 274—4)

Figure 1:
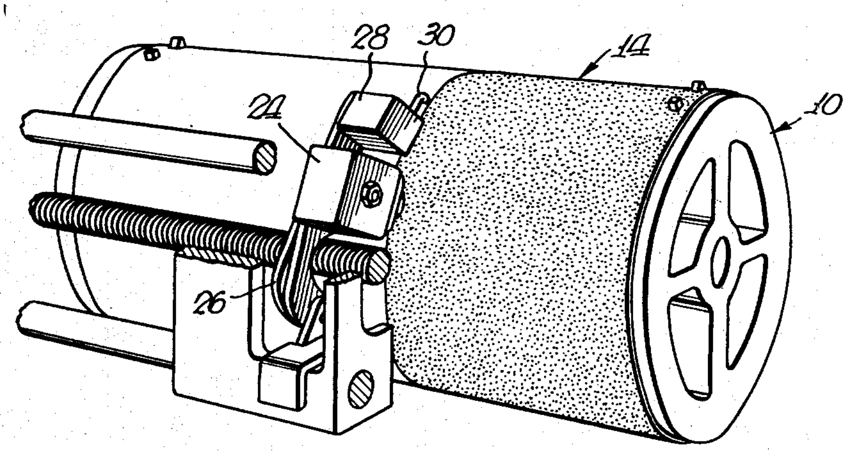

This invention relates to sound-recording and more particularly to a method and apparatus for indicating the progress of recording in a recording medium of the type wherein recording is so effected that no visually perceptible change in the medium occurs. The invention also relates to a record form useful in connection with the aforesaid method and apparatus, and to a method of making such a record form.

In recent years, various recording methods have been proposed which utilize recording media of such a character that recording is effected without any visually perceptible change in the medium. For example, in accordance with one method that has been proposed a record form in the shape of a tape, disc, belt, rectangular sheet or the like is prepared which contains or comprises a finely divided magnetizable material such as a finely divided iron oxide, and the magnetic condition of the record form is altered in a pattern that conforms with the sound pattern to be recorded. Such a record form may be made with any suitable base such as paper, cloth, glass, metal foil, or the like or a plastic material, such as cellulose acetate, and may be impregnated or coated with the finely divided magnetic material.

In the use of most sound recording apparatus such as office dictating machines, the dictator usually wishes to observe the progress of recording so that he can determine what proportion of the record form has been used at any given time. Also, when he listens back to the previously recorded portions of the sound record, it is convenient, after he has listened back, to be able to locate visually the point at which recording may be resumed without interfering with the previous recording. In the case of magnetic recording media, the recording head that cooperates with the record form containing the magnetizable material rides on the surface of the record material but usually does not mark the record material; and even if it does, the resulting marking of the record material is not sufficient to be plainly visible to an observer.

Accordingly, it is an object of the present invention to provide a record form incorporating a recording medium of the type in which recording is so effected that no visually perceptible change in the recording medium occurs, which record form is so made that the progress of recording i. e. the extent to which recording has taken place in the record form, can be plainly indicated thereon. It is another object of the invention to provide, in sound-recording apparatus utilizing such a record form, mechanism adapted to cooperate with the record form to produce thereon a plainly visible indication of the progress of recording in the form. It is a further object of the invention to provide a method of making such a record form. It is still another object of the invention to provide a simple and effective method for indicating the progress of recording in a recording medium of the type wherein recording is effected without any visually perceptible change in the medium. Other objects of the invention will be in part obvious and in part pointed out hereafter.

In one of its broader aspects, the invention may be embodied in a record form comprising a recording medium of the type wherein recording is so effected that no visually perceptible change in the medium occurs, and a pressure-sensitive surface capable of being altered to indicate the progress of recording in the record medium. The recording medium may be a magnetic medium or a medium so constructed that some of its other properties can be altered to record a desired sound pattern without a visible change in the medium. As will be more fully described hereafter, the pressure-sensitive surface of the record medium may be produced either by incorporating a suitable substance in the record medium during its manufacture or by providing the record medium with a suitable coating.

Figure 2:
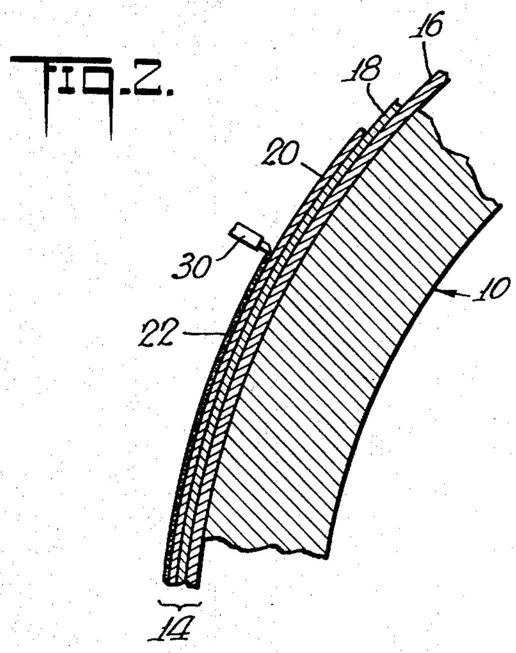

In a somewhat narrower aspect, the present invention comprises a method and apparatus for indicating the progress of recording in a recording medium of the type described. The method and apparatus of the invention may be conveniently described with reference to the accompanying drawing which illustrates apparatus incorporating a preferred embodiment of the apparatus invention and capable of being used to carry out the method of the invention and wherein:

Figure 1 is a perspective view of a record form mounted on a mandrel, and a recording head mounted in operative relation with respect thereto; and Figure 2 is a fragmentary section through the record form and mandrel showing the construction of the form and the manner in which the recording head and stylus cooperate therewith to indicate the progress of recording therein.

In the co-pending application of Roberts et al., Serial No. 767,210 filed August 7, 1947, there is disclosed in detail an office dictating machine of a type adapted to use a magnetic recording medium in rectangular sheet form. The apparatus and methods of the present invention are well adapted to be incorporated in and used with a sound recorder of the type disclosed in the Roberts et al. application. Since the present invention is directed to only a portion of the apparatus disclosed in the Roberts et al. application, the drawings of the present application disclose only those parts of the Roberts et al. apparatus that have been modified in accordance with the present invention, and for such details as the construction of the mandrel, recording head, and mechanism for moving the mandrel and recording head, reference is made to this co-pending application.

Referring to the drawing, the numeral 10 generally designates a mandrel having a suitable cylindrical surface adapted to receive the record form 14. In the present instance the record form is a rectangular sheet that is wrapped around the mandrel 10 and held thereon in the manner described in the Roberts et al. application. The structure of the record form 14 is shown diagrammatically in Figure 2 and the method for its manufacture is described in detail hereafter. The form comprises a sheet of paper 16 on which there is deposited a layer 18 containing finely divided magnetizable particles held together by a suitable binder. Superposed on the magnetic layer 18 there is a coating of lacquer 20 which has a blushed surface 22 that is easily deformable by pressure.

As shown in Figure 1, a recording head 24 is mounted to ride on the surface of the record form 14 and, as described in the Roberts et al. application referred to above, the mandrel 10 with the record form 14 thereon is rotated, and the recording head 24 slowly traverses the rotating mandrel to cause the recording head to cooperate with the magnetic layer 18 to produce a helical sound track having a magnetic pattern conforming with the sound pattern being recorded. Mounted adjacent to the recording head 24, there is a stylus arm 26 which traverses the mandrel with the recording head and is provided at its upper end with a weight 28 and a stylus 30. The weight 28 causes the stylus to bear against the blushed lacquer coating 20 of the record form 14. As the recording head 24 and stylus 30 are moved relative to the record form 14, the stylus deforms the blushed surface 22 of the lacquer coating 20, thus producing a line or marking of contrasting color that provides a plainly visible indication of the progress of recording within the magnetic layer 18 of record form 14.

In order to point out more fully the nature of the record form of the present invention and the manner in which it can be made, the following specific example of an illustrative method of making a record form is given: a solvent mixture is prepared containing 20% butyl acetate, 10% ethyl acetate, 25% methylethyl ketone, 10% normal butanol, 5% completely denatured ethanol and 30% toluene (all percentages by weight). In 844 parts by weight of this solvent mixture, 46 parts by weight of 0.5 second nitrocellulose are dissolved, and a plasticizer added comprising 8 parts by weight of a mixture of solid chlorinated diphenyls having a boiling point between 385° C. and 420° C., which mixture may be the product sold under the trade name Aroclor No. 1260. Two parts of a suitable wetting agent such as a dioctyl sodium sulfosuccinate, sold under the trade name Aerosol OT, are preferably added to the solution.

In the nitrocellulose solution as thus prepared, there are dispersed 340 parts by weight of finely divided iron oxide i. e. gamma $Fe_2O_3$, having a particle size of 1 micron or less. Such a finely divided magnetizable iron oxide may conveniently be a pigment, such as the pigment sold under the trade name Mapico Brown No. 420. The mixture of the finely divided magnetic material and solution is milled in a ball mill to produce a uniform dispersion of the magnetic material in the solvent and is then sprayed on a sheet of tracing paper, two coats being used to provide the desired thickness of coating. The coating may be of the order of as much as 2 mils in thickness.

After the coated paper has been dried by evaporation of the solvent, the resulting paper and magnetic coating are then coated with a lacquer. This lacquer may comprise 5 grams of 0.5 second nitrocellulose dissolved in a solvent mixture comprising 50 grams of a solvent of the general type described above, 50 grams of ethyl acetate, and 500 grams of methanol. The lacquer is sprayed on the magnetic coating in a fine jet and allowed to soak into the coating for a period of 15–30 seconds, after which it is dried rapidly. The drying is effected with a jet of damp air in which a fine aqueous fog is preferably dispersed in order to cause the surface of the lacquer to blush. By using such a fine fog dispersed in air for evaporating the solvent of the lacquer coating, a relatively uniform blushed surface is produced on the lacquer, which surface is easily deformable as described above.

The deformable coating of the present invention is not necessarily a blushed lacquer and the following example is given of a composition which produces a deformable coating without the use of the lacquer: A solvent mixture is prepared consisting of 60 parts by weight of water, 30 parts by weight of acetone and one part by weight of an aryl alkyl polyether alcohol, which may be the product sold under the trade name Triton N. E. In this solvent, 5 parts by weight of a solid polyethylene glycol, which may be Carbowax 4000, 2.5 parts by weight of hydroxyethyl cellulose, and 2.5 parts by weight of soluble starch are dissolved. The resulting solution is sprayed on the magnetic coating as before, and then allowed to dry in the usual manner without application of wet air thereto, whereupon a suitably deformable surface is formed.

The magnetic coating and blushed lacquer coating need not be formed separately but may be formed as a single layer, and the following example illustrates a composition comprising both the magnetic substance and the material forming the blushed lacquer surface: To 422 parts by weight of the solvent described above in connection with the preparation of the iron oxide dispersion are added 23 parts by weight of 0.5 second nitrocellulose, 15 parts by weight of a mixture of ortho and para toluene ethyl sulphonamides, which may be the product sold under the trade name Santicizer No. 8, 10 parts by weight of chlorinated diphenyls (Aroclor No. 1260), 30 parts by weight of a condensation product of formaldehyde and aromatic sulphonamides, which may be the product sold under the trade name Santolite MHP, and one part of a wetting agent, such as the product sold under the trade name Aerosol OT. In this solution 170 parts by weight of gamma iron oxide are dispersed as before, and the resulting dispersion is sprayed on tracing paper and dried with damp air to provide on the paper a magnetic layer that has a blushed surface which is deformable as described above.

From the foregoing description it is apparent that the present invention provides a simple and effective method, apparatus, and record form for indicating the progress of recording in a sound recording medium of the type in which the nature of the recording process is such that no visually perceptible change in the medium occurs. It has been found that the pressure-sensitive coatings disclosed herein, and more especially the coating of the preferred record form is easily deformable to give a plainly visible indication of the progress of recording in the underlying recording medium. Moreover, since the coating is quite thin, it does not unduly interfere with the recording effectiveness of the recording medium.

The specific examples given above of methods of producing pressure-sensitive surfaces are of course illustrative only. For example, the base sheet on which the magnetizable layer is deposited need not be tracing paper but may be any suitable sheet material, including those mentioned at the beginning of the present specification. Either the magnetizable layer or the lacquer layer or both may be applied otherwise than by spraying, as for example by brushing or dipping. Other binders and solvents may be substituted for those specifically disclosed. Numerous other modifications within the scope of the invention will occur to those skilled in the art.

Since many embodiments might be made of the present invention and since many changes might be made in the embodiment disclosed herein, it is to be understood that the foregoing description is to be interpreted as illustrative only and not in a limiting sense.

We claim:

1. In apparatus for recording sound, in combination, a magnetic recording medium in sheet form, a blushed lacquer coating on said medium, a recording head positioned adjacent to the surface of said recording medium, said recording head being responsive to sound to be recorded and adapted to cooperate with said medium to record said sound in said medium, mechanism for producing relative movement of said recording head and medium to produce a helical sound track in said medium, and an element mounted for movement with said recording head and bearing against said coating to remove said blushed coating and thereby indicate the progress of recording in said medium.

2. In apparatus for recording sound, in combination, a rotatable mandrel, a magnetic recording medium mounted on said mandrel for rotation therewith, a blushed lacquer coating on said medium, a recording head positioned adjacent to the surface of said recording medium, said recording head being responsive to sound to be recorded and adapted to cooperate with said medium to record said sound therein, said recording head being movable axially of said mandrel as said mandrel rotates to produce a relatively tight helical sound track in said medium, and an element secured to said recording head and positioned to bear against said medium to remove said blushed coating therefrom and thereby indicate progress of recording in the medium.

3. A sound record form for use in a magnetic recording machine having a sound recording head and pressure operated stylus positioned to bear against the form to indicate progress of recording therein, said record form comprising a paper base and a thin layer of a synthetic plastic bonded thereto, said plastic layer having finely divided magnetic iron oxide particles dispersed therethrough and having a blushed surface capable of changing color upon application of pressure thereto.

4. A sound record form for use in a magnetic recording machine having a sound recording head and pressure operated stylus positioned to bear against the form to indicate progress of recording therein, said record form comprising a paper base, a first layer of a nitrocellulose bonded thereto, said nitrocellulose having finely divided magnetic iron oxide particles dispersed therein and a second layer of nitrocellulose overlying said first layer and having a blushed surface capable of changing color upon application of pressure thereto.

5. In apparatus for recording sound, in combination, a recording medium of the type wherein recording is so effected that the recording produces no visually perceptible change in said medium, said medium having a blushed lacquer coating thereon, a recording head positioned close to the surface of said medium, said recording head being responsive to sound to be recorded and adapted to cooperate with said medium to record said sound in said medium, mechanism for producing relative movement of said recording head and medium to produce a sound track in said medium and an element operatively associated with said recording head and positioned to bear against said blushed coating, whereby as said head and medium are relatively moved, said element removes a portion of said blushed coating to indicate the progress of recording in said medium.

6. In apparatus for recording sound, in combination, a movable support, a magnetic recording medium mounted on said support, said medium having a blushed lacquer coating thereon, a recording head positioned close to the coated surface of said medium, said recording head being responsive to sound to be recorded and adapted to cooperate with said medium to record said sound in said medium, mechanism for producing relative movement of said recording head and movable support to produce a sound track in said medium and an element mounted on said recording head and positioned to bear against said blushed coating, whereby as said head and medium are relatively moved, said element removes a portion of said blushed coating to indicate the progress of recording in said medium.

References Cited in the file of this patent

UNITED STATES PATENTS

| Number | Name | Date |
|---|---|---|
| 1,653,467 | O'Neill | Dec. 20, 1927 |
| 1,808,046 | Kuchenmeister | June 2, 1931 |
| 1,949,840 | Languepin | Mar. 6, 1934 |
| 2,199,526 | McCowen | May 7, 1940 |
| 2,265,879 | Thurm | Dec. 9, 1941 |
| 2,299,991 | Kallock | Oct. 27, 1942 |
| 2,313,810 | Dalton | Mar. 16, 1943 |
| 2,418,479 | Pratt et al. | Apr. 8, 1947 |
| 2,426,445 | Frisch et al. | Aug. 26, 1947 |
| 2,447,380 | Wenger | Aug. 17, 1948 |
| 2,452,152 | Rooney et al. | Oct. 26, 1948 |
| 2,469,537 | Wohrer | May 10, 1949 |
| 2,524,433 | Downs et al. | Oct. 3, 1950 |
| 2,525,601 | Howell | Oct. 10, 1950 |
| 2,581,499 | Roberts | Jan. 8, 1952 |

FOREIGN PATENTS

| Number | Country | Date |
|---|---|---|
| 324,099 | Great Britain | Jan. 17, 1930 |
| 177,647 | Switzerland | June 15, 1935 |
| 466,023 | Great Britain | May 18, 1937 |
| 618,349 | Great Britain | Feb. 21, 1950 |